United States Patent Office 2,765,348
Patented Oct. 2, 1956

2,765,348

PROCESS FOR THE SEPARATION OF 2,6-DINITRO-TOLUENE FROM ITS ADMIXTURE WITH 2,4-DINITROTOLUENE

Walter E. Baumgartner and Gilbert P. Monet, Wilmington, Del., assignors to E. I. du Pont de Nemours and Company, Wilmington, Del., a corporation of Delaware No Drawing. Application April 18, 1955,
Serial No. 502,228

6 Claims. (Cl. 260—645)

This invention is directed to a process for obtaining pure 2,6-dinitrotoluene from its admixture with 2,4-dinitrotoluene and normal impurities.

The dinitrotoluenes are extremely useful compounds as intermediates in the formation of diamines which have a well known utility as dye intermediates, for conversion to diisocyanates and subsequent resins, antioxidants and the like. A known manufacturing procedure for dinitrotoluenes involves the dinitration of toluene; said process produces a mixture consisting primarily of 2,4-dinitrotoluene and 2,6-dinitrotoluene together with lesser amounts of other isomers; the 2,4-dinitrotoluene is then isolated by crystallization. However, in this conventional crystallization process, only a fraction of the 2,4-dinitrotoluene is removed and the liquid remaining consists of impurities and approximately equal amounts of 2,4-dinitrotoluene and 2,6-dinitrotoluene; this mixture of isomers is commonly referred to as eutectic oil and because of different operating procedures, the amounts of 2,4-dinitrotoluene and 2,6-dinitrotoluene in said oil will vary.

Normally the weight ratio of 2,4-dinitrotoluene to 2,6-dinitrotoluene as obtained by this known crystallization process is between about 0.75:1 and 1.2:1. It is to this mixture of isomers that the process of the present invention is directed.

It is an object of this invention to separate 2,6-dinitrotoluene from its admixture with 2,4-dinitrotoluene. It is a further object of this invention to make available pure 2,6-dinitrotoluene. These objects are accomplished by a novel process which consists of adding, to an isomer mixture of 2,4-dinitrotoluene and 2,6-dinitrotoluene and impurities, aniline or a lower alkyl substituted aniline and cooling the resulting mixture to below 0° C. but above the temperature at which the mass solidifies; the crystals of 2,6-dinitrotoluene which form are then recovered by filtration.

It is old in the art to react nitro compounds other than dinitrotoluene isomers with amines to form crystalline addition products (salts) or strongly colored complexes in solution; such addition complexes have been used to isolate or purify the component of a mixture which has the strongest tendency to form an addition complex. The process of the present invention, however, is the reverse of this known process since the 2,4-isomer which has the strongest tendency to react with amines remains in solution, the 2,6-isomer being isolated in crystalline form.

The amount of aromatic amine that may be added to the isomer mixture in the present novel process may vary from 0.3 to 0.8 parts by weight of amine per part of isomer mixture. If too much amine is used it will act as solvent for the 2,6-dinitrotoluene and reduce the yield obtained; if insufficient amine is used the purity of the 2,6-dinitrotoluene isolated may be impaired in that small amounts of the 2,4-isomer may be present. It has been found that the amounts of amine indicated above give satisfactory results when employing the mixture of 2,4 and 2,6-dinitrotoluene which normally results from the dinitration of toluene.

The aromatic amines operable in this invention comprise aniline and lower alkyl substituted anilines wherein the alkyl substituent is one of 1 to 4 carbons. The substituted aniline may have a methyl, propyl, isopropyl, butyl, secondary butyl or tertiary butyl substituted either in the aromatic ring or on the amino nitrogen, or at both positions, examples of which are aniline, dimethyl aniline, the toluidines, ortho, meta and para-toluidine, N-ethyl-para-toluidine, N-propyl-meta-toluidine, N-methyl-ortho-toluidine and N,N-dimethyl-meta-toluidine. Other operable aromatic amines are 4-isopropyl-aniline, 4 ethyl N-methyl-N-ethyl aniline, N-ethyl aniline, N,N-diethyl aniline, N-methyl and isopropyl aniline, 4-tert. butyl N,N-dimethyl aniline and the like. Further operable aromatic amines are the xylidines such as 2,3-dimethyl aniline, 3,5-dimethyl aniline, 2,6-dimethyl aniline and 2,4-dimethyl aniline. Mixtures of these amines may also be utilized.

It is possible in the present novel process to isolate not only the 2,6-isomer but also the 2,4-isomer from its conventional occurring mixture. After the 2,6-dinitrotoluene is separated by filtration, a change in composition is effected by the addition of acid which destroys the 2,4-dinitrotoluene amine complex and on cooling, 2,4-dinitrotoluene crystallizes out until the eutectic is reached.

As already indicated the mixture of 2,4 and 2,6-dinitrotoluene resulting from the dinitration of toluene will be such that the weight ratio of 2,4-isomer to 2,6-isomer is between about 0.75:1 and 1.2:1. Such a mixture normally results from conventional nitration processes of toluene and subsequent crystallization of the major amount of 2,4-isomer that is present. There are present however other products in this composition, particularly the isomers of dinitrotoluene and also present are some mononitrotoluenes as well as nitrobenzenes. These impurities result from the fact that the original toluene probably contains benzene and further from the fact that in the nitration process small amounts of other position isomers are formed. Normally these impurities do not interfere with the process of this invention providing that the ratio of 2,4 and 2,6-isomers fall within the range indicated above and providing that the concentration of the impurities does not exceed about 25% by weight.

Examples which illustrate this novel process follow:

EXAMPLE 1241 parts of dimethylaniline and 2000 parts of a mixture of dinitrotoluene isomers consisting of 47% by weight of 2,6-dinitrotoluene and 40% by weight of 2,4-dinitrotoluene and 13% impurities are stirred and cooled slowly to —10° C. at which point crystals appear. The temperature rises slightly, but is slowly cooled back and is held between —9 and —10° C., agitation being maintained. When no more crystals appear to form, which can be noted by a temperature decrease, the mass is filtered and the solid material on the filter is pressed dry. The solid crystals are then slurried twice in 500 parts of 1:1 hydrochloric acid in order that any adhering dimethylaniline be removed. The crystals are filtered again and pressed dry and in this way a 53% yield of 2,6-dinitrotoluene (based on the amount of 2,6-isomer present in the eutectic oil) is obtained whose purity by infrared analysis is 97%.

Using the above procedure a number of additional runs were made with 2,4 and 2,6-dinitrotoluene mixtures of various compositions, using various amounts and different kinds of amines, and crystallizing at various temperatures. Tables I and II which follow illustrate the results obtained.

Table I

| Composition of Eutectic Oil, Percent by Wt. 2,6/2,4/Impurity | Parts by Weight of 2,4-isomer per Part of 2,6-isomer | Parts by Weight of N,N-Dimethyl-Aniline per Part of Eutectic Oil | Percent Yield of 2,6-Dinitrotoluene with Temperature of Crystallization | Percent Purity of 2,6-Dinitrotoluene |
|---|---|---|---|---|
| 44.6/48.2/7.2 | 1.08:1 | 0.478 | 15.8/—4° C | 56.0 |
|  |  | 0.575 | 21.5/—4° C | 82.0 |
|  |  | 0.670 | 24.6/—10° C | 68.0 |
|  |  | 0.716 | 21.8/—14° C | 81.0 |
| 47/40/13 | 0.85:1 | 0.621 | 53.2/—10° C | 97.0 |
|  |  | 0.335 | 20.2/—1° C | 84.4 |
| 49.4/41.1/9.5 | 0.83:1 | 0.382 | 34.4/—3° C | 97.3 |
|  |  | 0.478 | 38.4/—5° C | 97.6 |
|  |  | 0.575 | 37.0/—9° C | 98.2 |
|  |  | 0.382 | 32.6/—25° C | 96.4 |
| 42.3/41.1/16.6 | 0.97:1 | 0.430 | 35.0/—30° C | 96.3 |
|  |  | 0.477 | 35.6/—20° C | 98.0 |
|  |  | 0.572 | 32.9/—28° C | 97.6 |

Table II

| Composition of Eutectic Oil, Percent by Weight 2,6/2,4/Impurity | Parts by Weight of 2,4-isomer per Part of 2,6-isomer | Amine Added | Parts by Weight of Amine per Part of Eutectic Oil | Percent Yield of 2,6-isomer with Temperature of Crystallization | Percent Purity of 2,6-isomer |
|---|---|---|---|---|---|
| 42.3/41.1/16.6 | 0.97:1 | Aniline | 0.510 | 11.7/—15° C | 95 |
|  |  | N-Methylaniline | 0.394 | 20.2/—15° C | 95 |
|  |  | N,N-Dimethylaniline | 0.478 | 35.7/—5° C | 97 |
| 52.1/42.7/5.2 | 0.82:1 | N,N-Dimethyl-m-toluidine | 0.565 | 35.9/—3° C | 80 |
|  |  |  | 0.660 | 38.0/—7° C | 93 |
|  |  |  | 0.753 | 31.8/—10° C | 83 |

We claim:

1. A process for the separation of 2,6-dinitrotoluene from 2,4-dinitrotoluene and impurities of not more than 25% by weight, which comprises adding 0.3 to 0.8 parts by weight of aromatic amine, per part by weight of the starting mixture, taken from the group consisting of aniline and an alkyl substituted aniline, the alkyl substituent having 1 to 4 carbons, to a mixture of 2,6-dinitrotoluene, 2,4-dinitrotoluene and impurities, said mixture having a weight ratio of 2,6-dinitrotoluene to 2,4-dinitrotoluene within the range of 1:0.75 to 1:1.2; cooling the mixture to below 0° C. to a temperature at which 2,6-dinitrotoluene crystals form, the lower limit of said cooling temperature range being a temperature above that temperature at which solidification of the entire mixture begins and recovering the 2,6-dinitrotoluene crystals formed by filtration.

2. The process of claim 1 wherein the aromatic amine is N-methylaniline.

3. The process of claim 1 wherein the aromatic amine is N,N-dimethyl-m-toluidine.

4. The process of claim 1 wherein the aromatic amine is N,N-dimethylaniline.

5. The process of claim 1 wherein 0.5 part of N,N-dimethylaniline per part of the starting mixture is added.

6. The process of claim 5 wherein the temperature of crystallization of the 2,6-dinitrotoluene component is between 0° C. and —30° C.

No references cited.